United States Patent [19]

Reed et al.

[11] 3,977,427

[45] Aug. 31, 1976

[54] CONTROL OF THE VISCOSITY OF FUEL OIL FOR BURNERS

[75] Inventors: Robert D. Reed; Harold F. Koons, both of Tulsa, Okla.

[73] Assignee: John Zink Company, Tulsa, Okla.

[22] Filed: Sept. 18, 1975

[21] Appl. No.: 614,691

[52] U.S. Cl................................. 137/334; 137/13
[51] Int. Cl.² ................... F16K 19/00; F16K 49/00
[58] Field of Search.................... 137/13, 92, 334

[56] References Cited
UNITED STATES PATENTS

| | | | |
|---|---|---|---|
| 3,277,916 | 10/1966 | Deming | 137/92 X |
| 3,424,191 | 1/1961 | Murdock | 137/334 |

*Primary Examiner*—Henry T. Klinksiek
*Attorney, Agent, or Firm*—Head, Johnson & Chafin

[57] ABSTRACT

An apparatus for the control of the viscosity of fuel oil supplied to burners, which comprises, in series, pump means for supplying the fuel oil to the burner system under a selected pressure, means for heating the fuel oil output of the pump means, strainer means and control valve means and orifice means of selected length and diameter. A differential pressure cell monitors the pressure drop across the orifice due to the flow of fuel oil under a selected pressure set by the control valve. Any variations in differential pressure will be due to corresponding inverse variations of viscosity. The variations in the output of the differential pressure cell are communicated to a valve means which controls the amount of steam passing into the heating means, thus controlling the temperature of the fuel oil, and therefore its viscosity, to a proper value.

8 Claims, 4 Drawing Figures

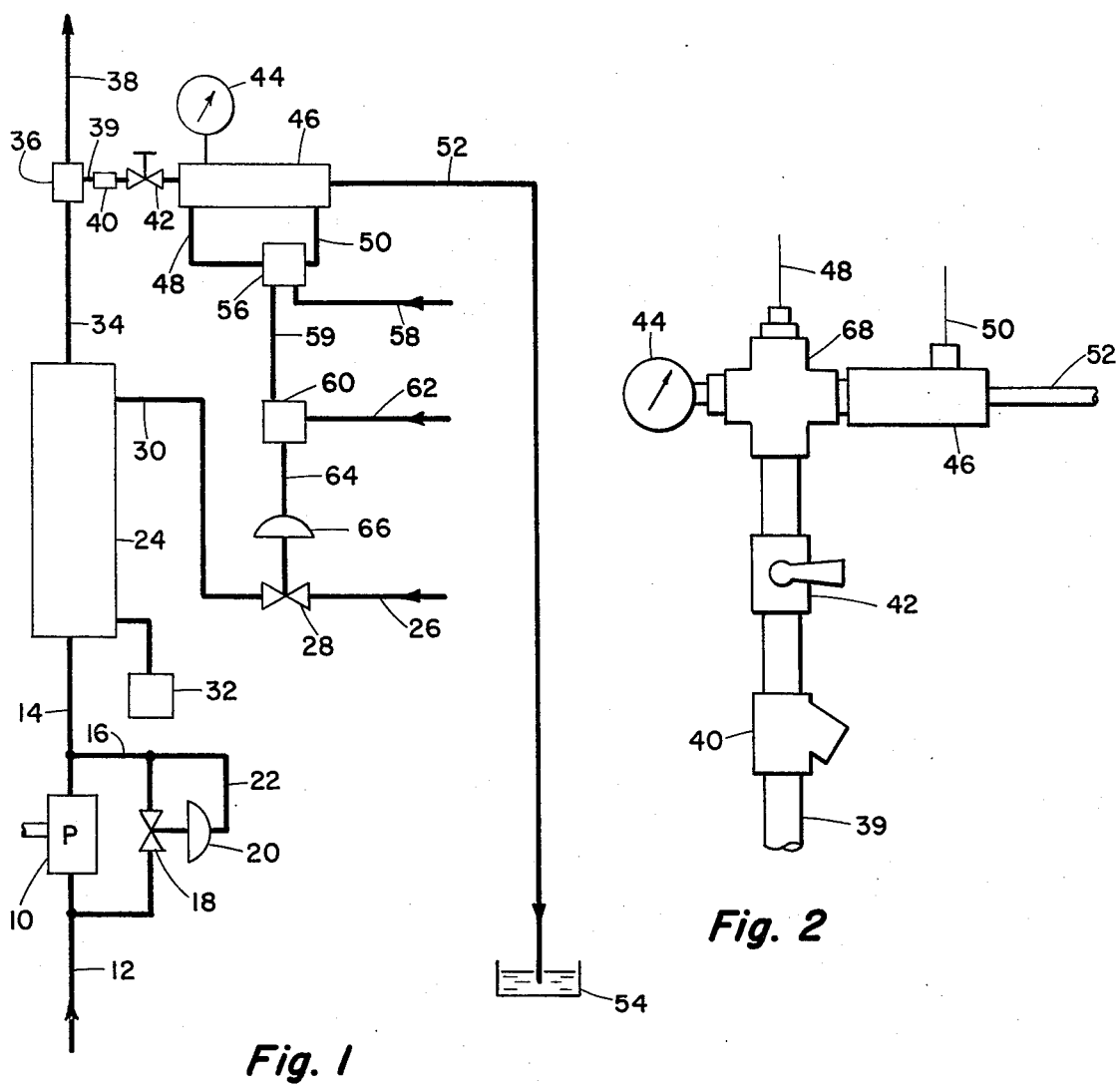
Fig. 1
Fig. 2
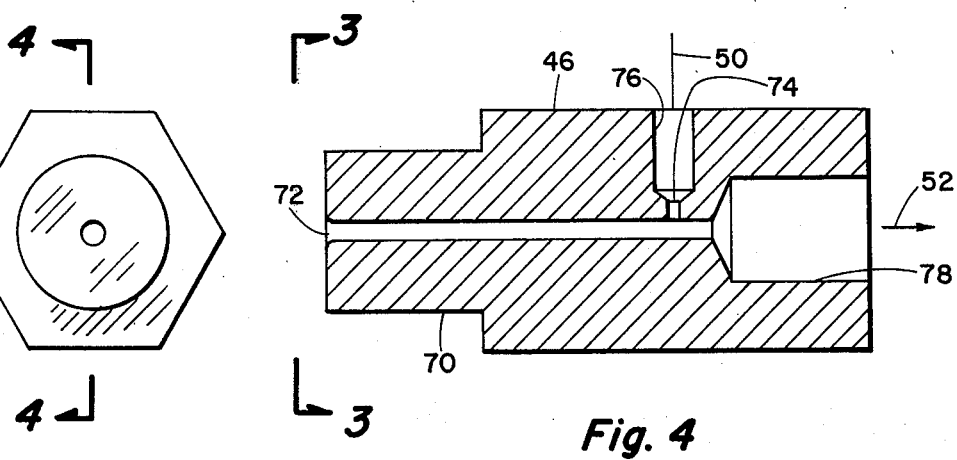
Fig. 3
Fig. 4

CONTROL OF THE VISCOSITY OF FUEL OIL FOR BURNERS

BACKGROUND OF THE INVENTION

1. Field of the Invention

This invention lies in the field of control means for fuel oil supplied to burners. More particularly, it is the field of control means for control of the viscosity of fuel oil supplied to burners. Still more particularly, it is a control means for controlling the viscosity of fuel oil based upon a measurement of viscosity of the fuel oil by determining the variations in pressure drop through a constant dimension orifice, due to viscosity variations, and controlling the supply of steam to a fuel heater so as to alter the temperature and thus the viscosity, so as to maintain the viscosity at a selected value.

2. Description of the Prior Art

A serious problem associated with the burning of fuel oils is the control and maintenance of viscosity of the fuel oil as it is burned, to an optimum viscosity which is most desirable for the operation of the fuel burners. The reason is that for satisfactory and efficient burning of fuel oil, there is an optimum or preferred condition of minimal viscosity for the fuel oil as it is delivered for immediate burning, but the required temperature for suitable viscosity on different fuel oils may vary widely. Thus, a temperature of preheat which is satisfactory for one fuel oil, to reduce its viscosity as burned to an optimum condition, is not at all satisfactory for another fuel oil.

This problem has caused a number of entries into the art of viscosity control. One such entry relied on a vibrating reed for viscosity sensing and control. Another entry views the characteristic of constant oil flow across a viscosimeter orifice (reference page 22-39, *Perry's Chemical Engineers Handbook*, 4th Edition, McGraw-Hill).

A characteristic of the flow of viscous fluids, is that, as viscosity increases, there is interference with flow. For flow of a fixed quantity of viscous fluid the pressure drop increases as viscosity of the fluid increases, and vice versa. For a flow of viscous fluid at fixed pressure drop the quantity of fluid decreases as the viscosity increases and vice versa. In a fixed passageway, velocity of flow is directly proportional to quantity of flow, therefore, in this invention the control means is provided by a velocity variation.

SUMMARY OF THE INVENTION

It is the primary object of this invention to provide an apparatus for constantly monitoring the viscosity of preheated fuel oil supplied to a burner system, so as to control the heat applied to the fuel oil in the preheater, so as to maintain a selected value of viscosity of the fuel oil.

It is another object of this invention to control the viscosity by monitoring the pressure drop across an orifice of fixed dimension.

These and other objects are realized and the limitations of the prior art are overcome in this invention, by providing a fuel pump and fuel preheater to supply preheated fuel oil under pressure to the burners. At the outlet of the preheater, at the beginning of the line to the burners, a part of the flow of fuel oil is diverted or bypassed through a viscosity sensing apparatus. This comprises a bypass line, including a strainer to remove small solid particles of carbon and other debris, principally to avoid stoppage of a passage through a control valve and through a long orifice. The strained fuel oil then passes to a control valve, and to an orifice of selected length and diameter. The outlet of the orifice is then bypassed to a sump from which it is picked up by the pump means and recirculated.

The orifice is a drilled hole of selected diameter in a block of metal. The bypass control valve is used to set a selected pressure on the gauge at the inlet to the orifice. The outlet pressure of the orifice is essentially atmospheric. A differential pressure cell is connected across the inlet and the outlet of the orifice. The cell monitors the pressure drop of the fuel oil which flows under constant pressure set by the valve. As the viscosity of the fuel oil at the outlet of the preheater varies, the pressure drop in the orifice will also vary, and this variation controls a pilot which in turn controls a valve in the steam line, so as to correspondingly alter the steam supplied to the preheater so as to maintain a constant outlet viscosity.

BRIEF DESCRIPTION OF THE DRAWINGS

These and other objects and advantages of this invention and a better understanding of the principles and details of the invention will be evident from the following description taken in conjunction with the appended drawings, in which:

FIG. 1 represents in schematic form an embodiment showing a complete control system.

FIG. 2 illustrates in apparatus form, a portion of the control system.

FIGS. 3 and 4 provide two views of an orifice for use in the control system of FIG. 2. FIG. 4 is a cross-section taken along plane 4—4 of FIG. 3. FIG. 3 is an end view along plane 3—3 of FIG. 4.

DESCRIPTION OF THE PREFERRED EMBODIMENT

Referring now to the drawing, there is shown in FIG. 1 a piping and a schematic control diagram illustrating one embodiment of this invention. A flow line 12 connects to a fuel oil tank (not shown), and oil is delivered by the pump 10 under a selected pressure into line 14 to a fuel oil preheater 24. There is a bypass 16 around the pump 10, including a valve 18 controlled by means 20 and line 22, to maintain a constant pressure at the outlet of the pump 10, irrespective of the change in flow rate of fuel oil to the burners, as the requirement for heat varies.

Illustrated is a steam heater 24 of conventional design, which is supplied with steam by line 26 through remote control valve 28, and line 30 to the heater. The outlet of the steam system is to a steam trap 32, as is well-known in the art. The amount of heat supplied and the resulting temperature of the fuel oil, and therefore its viscosity, is a function of the amount of oil flowing through the heater to the burner, and the desired temperature of the fuel oil depending on its viscosity characteristic.

The heated fuel oil goes by way of outlet line 34 to a junction point 36 from which oil is supplied by line 38 to one or more burners, as desired. There is a side line, or bypass, 39 connected to the junction point 36, and fuel oil is diverted or bypassed from the point 36 over line 39 to a viscosity sensing and control system. This viscosity control system includes a screen 40 for screening out small particulate matter which might interfere with the flow of fuel oil through a metering orifice, to be described later. The screened and filtered oil then passes to a manual control valve 42, which is set so as to maintain a gauge pressure, as indicated by 44, in the range of about 3 to 5 psi. The bypassed fuel oil then goes into an orifice block 46, and passes out through line 52 to a sump 54. A pressure gauge 44 is connected at the inlet to the orifice, so as to indicate the inlet pressure in setting valve 42.

There are two pressure connections to the orifice block. Referring now to FIGS. 3 and 4 the orifice block comprises a block of metal having an axially drilled orifice 72. The length and diameter of the orifice 72 are determined by the general characteristic of the fuel oils to be burned. A pressure connection 74 is connected to the downstream end of the orifice 72, and a threaded opening 76 is provided for a pipe 50 which is the downstream pressure lead from the orifice to the differential pressure cell. The opening 78 is threaded for an outlet pipe 52 indicated in FIG. 1, for the bypassed fuel. The end portion 70 is threaded for insertion into a conventional pipe cross 68 of FIG. 2.

Referring back to FIG. 1, there are two pressure connections 48 and 50 connected to opposite input and output ends of the orifice 72 in the block 46. A differential pressure cell 56 is supplied with the two pressure leads on lines 48 and 50. Responsive to the differential pressure sensed by the cell, it controls air, which is provided by line 58, to provide a pressure on outlet line 64 to control means 66 of the valve 28 in the steam line 26. In other words, as the differential pressure across the orifice 72 changes, the differential pressure cell controls the pilot 60 which controls the steam valve 28 to allow more or less steam into the preheater 24, so as to alter the temperature of the fuel oil to be a selected value, to maintain the viscosity at a preselected value.

The differential pressure cell 56 and the pilot 60 are commercial instruments, and their choice and use are matters that can be determined by a man skilled in the arts. Also well-known is the control valve 28 for the steam line, so that the combination of the differential pressure cell across the orifice can provide a control servo, to maintain a rate of flow of steam into the preheater, which is proper to provide the desired viscosity of fuel oil to the burner.

A variation of the rate of flow of fuel oil is customary in the operation of burners, since various controls are provided to change the amount of heat supplied in accordance with the heat needed. However, means are provided in the bypass line 16 and valve 18 to maintain an outlet pressure of the pump 10 at a preselected value, as the quantity of fuel oil to the burner by line 38 varies. Consequently, with a constant pressure at the junction point 36 a fixed setting of the valve 42 will provide a selected gauge pressure 44 to provide a nominal flow of fuel oil through the orifice 72. With this nominal flow of oil, there will be a selected value of differential pressure sensed by the cell 56. If the viscosity should increase then the pressure drop will increase and the valve controls will be altered to permit an increased flow of steam to increase the outlet temperature of the fuel oil and therefore reduce its viscosity. This reduced value of viscosity will cause the differential pressure to drop back toward its nominal control value.

Referring to FIG. 2 there is shown in conventional apparatus form, the control apparatus of FIG. 1. The pipe 39 of FIG. 2 connects to the junction point 36 from which fuel oil is supplied to the burner by line 38. The line 39 goes to a strainer 40 and to a valve 42. While any type of valve can be used at the point 42 a "Vee-Port" valve is desirable since this style of valve has greater freedom from stoppage due to particulate matter that might pass into the valve with the fuel oil. Of course, with the strainer 40 there is a minimum of such particulate matter in the oil. However, the "Vee-Port" valve is considered to be a desirable type of valve for this use.

After the valve 42, the bypassed fuel oil goes to a cross 68. A gauge 44 is inserted into one arm of the cross, and a pressure tap 48 is connected to another arm of the cross. The fourth arm of the cross is connected to the orifice block 46, which is shown in detail in FIGS. 3 and 4. The threaded portion 70 of the block 46 is screwed into the corresponding arm of the cross 68. The by-passed fuel oil pipe 52 is connected to the outlet 78 of the orifice block and to the sump 54, all as shown in FIG. 1. The orifice 72 is designed to be of a size such that with oil of the selected viscosity the differential pressure drop across the orifice will be of a magnitude that can be used to control the steam supply valve. In actual use an orifice about 5/32 inch in diameter and 2 ½ inch long has been found to be satisfactory.

In this embodiment, the flow passageway is fixed and the pressure upstream of the orifice is gauge fixed by the valve 42. In the apparatus in FIG. 1, a constant outlet pressure is provided on the fuel preheater 24 irrespective of the quantity of fuel oil going to the burners. The quantity of fuel oil flowing out of the preheater can very widely, as fuel oil burning rate is adjusted to heat requirement, but the pressure at the point 36 remains substantially fixed. Through manipulation of the valve 42, the pressure indicated by the gauge 44 upstream of the orifice 72 is set at about 3 to 5 psi. Thus, fuel oil is caused to flow longitudinally from entry to exit through the 5/32 inch diameter and long orifice at a velocity when the viscosity is lowest. It is to be understood that the pressure indicated by the gauge 44 is set once and then is unchanged, because the base flow velocity in the orifice is fixed by the pressure indicated by gauge 44. Since the pressure downstream of the orifice is substantially zero gauge, the upstream pressure indicates pressure drop, and therefore fuel oil flow velocity in the orifice is fixed for a desired condition of viscosity. As previously stated, when the pressure drop is fixed the flow velocity through the orifice will decrease with increase of viscosity and vice versa.

Operation of the device is based on the principal of the venturi meter through sensing lower pressure upon velocity increase and vice versa, where the velocity altered pressure is sensed after pressure acceleration at the entry to the orifice by a sensitive differential pressure cell. The differential pressure cell compares the velocity-pressure with entering pressure. The entering pressure is sensed by the terminal 48 and the velocity-pressure is sensed by the terminal 50. Thus the steam as a heat medium for fuel oil preheat, is controlled in quantity, to maintain fuel oil temperature at the condition which will assure an optimum condition of low viscosity for fuel oil as burned.

The description of the apparatus in terms of actual pipe fittings shown in FIG. 2 is considered to be the preferred embodiment but not a limiting embodiment since other types of fixtures and control means can be provided to do the same job.

Since fuel oil characteristically carries carbon particles and other solids in suspension, and since these are not to be permitted to interfere with the adjustment of the opening through the valve 42, nor are they to be permitted to clog the orifice 72, the strainer is placed as shown for solids removal. Other elements are placed as shown for convenience.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. Apparatus for the control of the viscosity of fuel oil supplied to burners comprising:
   a. pump means for supplying liquid fuel to a burner system under a selected pressure;
   b. liquid fuel heating means through which the pressurized fuel is passed;
   c. means to control the heating of said fuel, whereby the temperature of said fuel is selectively increased or decreased;
   d. at the outlet of said fuel heating means, means to deliver fuel to a burner means;
   e. at the outlet of said fuel heating means, bypass valve means to control the bypass of liquid fuel through an orifice of selected length and diameter;
   f. differential pressure cell means connected across said orifice, and means responsive to the measured differential pressure to control said means to control the heating of said fuel.

2. The apparatus as in claim 1 in which said liquid fuel is fuel oil.

3. The apparatus as in claim 1 in which said liquid fuel heating means is a fluid heat media.

4. The apparatus as in claim 3 in which said fluid heat media is steam.

5. The apparatus as in claim 1 in which said means to control the heating of said fuel comprises remote control valve means to control the flow of steam to said fuel heating means.

6. The apparatus as in claim 1 including strainer means in the line supplying fuel to said bypass valve means.

7. The apparatus as in claim 5, including pilot control means responsive to the indication of said differential pressure cell means, said remote control valve means responsive to said pilot means.

8. The apparatus as in claim 1 including flow bypass means around said pump means, and means to control the flow of fuel through said bypass means, so as to maintain a selected pressure at the outlet of said pump means.

* * * * *